(12) United States Patent
Akaba et al.

(10) Patent No.: US 7,891,173 B2
(45) Date of Patent: Feb. 22, 2011

(54) EXHAUST GAS CLEANING APPARATUS AND METHOD THEREOF

(75) Inventors: Motoharu Akaba, Yokohama (JP); Suki I, Hwa-sung (KR); Takao Inoue, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 236 days.

(21) Appl. No.: 12/026,709

(22) Filed: Feb. 6, 2008

(65) Prior Publication Data

US 2008/0184699 A1    Aug. 7, 2008

(30) Foreign Application Priority Data

Feb. 7, 2007    (JP) .............................. 2007-027780

(51) Int. Cl.
*F01N 3/00*    (2006.01)
(52) U.S. Cl. .............................. 60/287; 60/274; 60/285; 60/288
(58) Field of Classification Search .................. 60/274, 60/287, 288, 299, 285
See application file for complete search history.

(56) References Cited

U.S. PATENT DOCUMENTS

| | | | | |
|---|---|---|---|---|
| 5,085,050 A | * | 2/1992 | Katoh | .......................... 60/288 |
| 5,398,503 A | * | 3/1995 | Danno et al. | .................... 60/288 |
| 5,577,383 A | * | 11/1996 | Kuroda et al. | ................... 60/284 |
| 6,397,586 B1 | * | 6/2002 | Sakurai et al. | ................. 60/288 |
| 7,509,800 B2 | * | 3/2009 | I et al. | ........................... 60/288 |
| 2006/0236682 A1 | | 10/2006 | I et al. | |

FOREIGN PATENT DOCUMENTS

| | | |
|---|---|---|
| CN | 1854475 A | 11/2006 |
| EP | 1217196 A2 | 6/2002 |
| EP | 1715152 A1 | 10/2006 |
| FR | 2790789 A1 | 9/2000 |
| JP | 2005-351088 A | 12/2005 |

\* cited by examiner

*Primary Examiner*—Thomas E Denion
*Assistant Examiner*—Diem Tran
(74) *Attorney, Agent, or Firm*—Global IP Counselors, LLP

(57) ABSTRACT

An exhaust gas cleaning apparatus is provided that has a main exhaust passage, a main catalytic converter disposed in the main exhaust passage, a bypass exhaust passage, a bypass catalytic converter disposed in the bypass exhaust passage, a selector valve and a controller. The controller controls the internal combustion engine to a rich combustion state with a rich air fuel ratio while the controller controls the selector valve to block the flow of the exhaust gas through the main exhaust passage, and then, afterwards, controls the selector valve to direct the flow of the exhaust gas through the main exhaust passage such that residual air remaining in the main exhaust passage mixes with rich exhaust gas from the bypass exhaust passage.

18 Claims, 4 Drawing Sheets

EXHAUST GAS CLEANING APPARATUS AND METHOD THEREOF

CROSS-REFERENCE TO RELATED APPLICATIONS

This application claims priority to Japanese Patent Application No. 2007-027780, filed on Feb. 7, 2007. The entire disclosure of Japanese Patent Application No. 2007-027780 is hereby incorporated herein by reference.

BACKGROUND OF THE INVENTION

1. Field of the Invention

The present invention generally relates to an exhaust gas cleaning apparatus for cleaning exhaust gas from an internal combustion engine with a catalytic converter. More particularly, the present invention relates to improving an exhaust gas cleaning apparatus by directing exhaust gas into a bypass path equipped with a separate catalytic converter during a period immediately after the engine is cold started during which a main catalytic converter installed in a main exhaust passage is not yet active.

2. Background Information

Most vehicles with an internal combustion engine are provided with an exhaust gas cleaning apparatus. Most exhaust gas cleaning systems are disposed under the floor of a vehicle and include a catalytic converter. When the catalytic converter is arranged in a relatively downstream position from the engine, a sufficient exhaust gas cleaning effect cannot be expected during a period from when the internal combustion engine is cold started until the temperature of the main catalytic converter rises and the main catalytic converter becomes active. Meanwhile, the further upstream a catalytic converter is arranged, i.e., the closer a catalytic converter is arranged to the engine, the service life of the catalytic converter declines due to thermal degradation of the catalyst.

Consequently, some vehicles are provided with an exhaust gas cleaning system that includes a main catalytic converter and a bypass catalytic converter having a smaller capacity than the main catalytic converter. One example of this type of exhaust cleaning system is disclosed in Japanese Laid-Open Patent Publication No. 2005-351088. In this publication, an exhaust gas cleaning apparatus is proposed that has a main exhaust passage with the main catalytic converter and a bypass exhaust passage provided in parallel with an upstream portion of the main exhaust passage. The bypass catalytic converter is provided in the bypass exhaust passage, and a selector valve is provided which allows the flow of exhaust gas to be directed to either the main exhaust passage or the bypass exhaust passage. The selector valve is controlled such that immediately after the engine is cold started, the exhaust gas passes through the bypass exhaust passage and is cleaned by the bypass catalytic converter. Since the bypass catalytic converter is positioned farther upstream than the main catalytic converter and the capacity thereof is smaller than that of the main catalytic converter, the bypass catalytic converter becomes active quickly and starts cleaning the exhaust gas at an early stage.

In view of the above, it will be apparent to those skilled in the art from this disclosure that there exists a need for an improved exhaust gas cleaning apparatus. This invention addresses this need in the art as well as other needs, which will become apparent to those skilled in the art from this disclosure.

SUMMARY OF THE INVENTION

It has been discovered that in the exhaust gas cleaning apparatus described above, there is residual air remaining in the upstream side of the main exhaust passage when the main catalytic converter reaches the active temperature and the flow of exhaust gas is switched from the bypass exhaust passage to the main exhaust passage. Consequently, when the flow path of the exhaust gas is switched, the residual air in the main exhaust passage mixes with the stoichiometric exhaust gas from the bypass exhaust passage and a lean mixture enters the main catalytic converter. Thus, even though the main catalytic converter is in an active state, there is the possibility that it will not be able to sufficiently clean the lean exhaust gas mixture and NOx will be discharged from the vehicle.

In view of the above, one object of the present invention is to provide an exhaust gas cleaning apparatus that can reliably clean exhaust gas during the period immediately after the internal combustion engine is started.

The above mentioned object can basically be attained by providing an exhaust gas cleaning apparatus that basically comprises a main exhaust passage, a main catalytic converter, a bypass exhaust passage, a bypass catalytic converter, a selector valve and a controller. The main exhaust passage is configured to receive exhaust gas from an internal combustion engine therethrough. The main catalytic converter is disposed in the main exhaust passage. The bypass exhaust passage includes a first end connected to the main exhaust passage at a first point that is upstream from the main catalytic converter and a second end connected to the main exhaust passage at a second point that is upstream from the main catalytic converter. The bypass catalytic converter is disposed in the bypass exhaust passage between the first and second ends of the bypass exhaust passage. The selector valve is arranged to selectively control a flow of the exhaust gas from the internal combustion engine between the main exhaust passage and the bypass exhaust passage. The controller is configured to control a combustion state of the internal combustion engine and to selectively open and close of the selector valve. The controller is further configured to control the internal combustion engine to a rich combustion state with a rich air fuel ratio while the controller controls the selector valve to block the flow of the exhaust gas through the main exhaust passage, and then, afterwards, controls the selector valve to direct the flow of the exhaust gas through the main exhaust passage such that residual air remaining in the main exhaust passage mixes with rich exhaust gas from the bypass exhaust passage.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
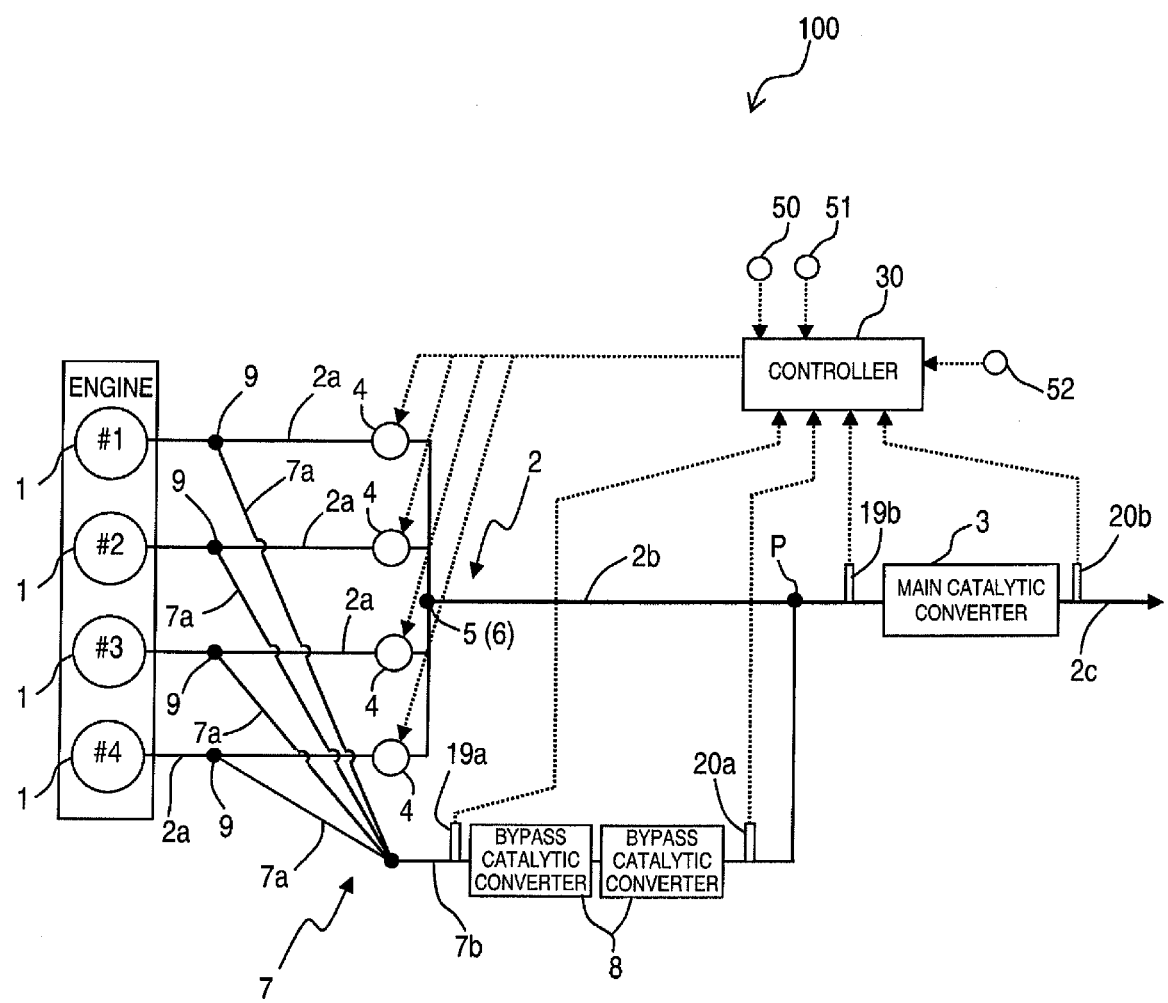
FIG. 1 is a simple schematic view illustrating an exhaust gas cleaning apparatus in accordance with one embodiment of the present invention.

Referring initially to FIG. 1, a simplified diagram of an exhaust gas cleaning apparatus 100 is illustrated in accordance with one embodiment of the present invention. The exhaust gas cleaning apparatus 100 is connected to an internal combustion engine exhaust having one or more cylinders 1. In particular, the exhaust gas cleaning apparatus 100 is fluidly connected to the exhaust ports of each of the cylinders 1 for receiving the exhaust gas from the cylinders 1 of the internal combustion engine. The exhaust gas cleaning apparatus 100 is configured such that the exhaust gas from an internal combustion engine is cleaned before being discharged to the outside.

The exhaust gas cleaning apparatus includes a main exhaust passage 2 for initially receive all of the exhaust gas from the cylinders 1 of the internal combustion engine and a main catalytic converter 3 disposed in the main exhaust passage 2 for cleaning the exhaust gas from the cylinders 1 of the internal combustion engine. The main catalytic converter 3 is arranged under the floor of a cabin of a vehicle. In the illustrated embodiment, the main exhaust passage 2 includes a plurality of upstream main exhaust passages 2a, an intermediate main exhaust passage 2b and a downstream main exhaust passage 2c.

The upstream ends of the upstream main exhaust passages 2a are fluidly connected to the exhaust ports of respective ones of the cylinders 1, i.e., the #1 to #4 cylinders, respectively, of the engine and the downstream ends are gathered together. The intermediate main exhaust passage 2b is fluidly connected to the downstream ends of the upstream main exhaust passages 2a and the upstream end of the downstream main exhaust passage 2c at a connection point P. The main catalytic converter 3 is disposed in the downstream main exhaust passage 2c with the downstream end of the downstream main exhaust passage 2c discharging the exhaust gas to the outside. The main catalytic converter 3 is installed in the downstream main exhaust passage 2c, and the catalysts of the main catalytic converter 3 include a three-way catalyst and an HC trap catalyst.

A selector valve 4 is provided in each of the upstream main exhaust passages 2a (each of which is connected to one of the cylinders 1 as mentioned above) near the gathering portion where the downstream ends of the upstream main exhaust passages 2a are fluidly connected to intermediate main exhaust passage 2b. The selector valves 4 are configured and arranged to open and close the upstream main exhaust passages 2a with respect to the intermediate main exhaust passage 2b. In particular, the upstream main exhaust passages 2a are fluidly connected together by a single passage located downstream of the selector valves 4, with a single merge portion 5 connecting to the intermediate main exhaust passage 2b. The selector valves 4 are closed when the engine is cold. When the selector valves 4 are closed, communication between the upstream main exhaust passages 2a and the intermediate main exhaust passage 2b is blocked.

Instead of providing the selector valves 4 in each of the upstream main exhaust passages 2a, it is also acceptable to use a single selector valve unit 6 provided at the merge portion 5. In the case of the selector valve unit 6 being provided at the merge portion 5, the selector valve unit 6 is provided with internal selector valves configured and arrange to open and close the cross sections of the upstream main exhaust passages 2a so as to permit or block communication between the upstream main exhaust passages 2a and the intermediate main exhaust passage 2b.

The exhaust gas cleaning apparatus 100 further includes a bypass exhaust passage 7 for diverting the exhaust gas through a pair of bypass catalytic converters 8 disposed in the bypass exhaust passage 7 when the selector valves 4 are closed. In the illustrated embodiment, the bypass exhaust passage 7 includes a plurality of upstream bypass exhaust passages 7a and a downstream bypass exhaust passage 7b. The downstream bypass exhaust passage 7b merges to the main exhaust passage 2 at the connection or merge point P where the intermediate main exhaust passage 2b and the downstream main exhaust passage 2c connect together.

The upstream ends of the upstream bypass exhaust passages 7a form a first end of the bypass exhaust passage 7. The upstream bypass exhaust passages 7a are connected to the upstream main exhaust passages 2a of the main exhaust passage, respectively, at first branch points 9 that are upstream from the main catalytic converter 3. Thus, the upstream bypass exhaust passages 7a branch from each of the upstream main exhaust passages 2a, and then merge together at the upstream end of the downstream bypass exhaust passage 7b.

The downstream end of the downstream bypass exhaust passage 7b forms a second end of the bypass exhaust passage 7. The downstream bypass exhaust passage 7b is connected to the intermediate main exhaust passage 2b of the main exhaust passage at the connection (second branch) point P that is upstream from the main catalytic converter 3. The bypass catalytic converters 8 are disposed in the bypass exhaust passage 7 between the first and second ends of the bypass exhaust passage 7, i.e., in the downstream bypass exhaust passage 7b. Thus, the bypass catalytic converters 8 are arranged upstream of the main catalytic converter 3.

When the selector valves 4 are closed, communication between the upstream main exhaust passages 2a and the intermediate main exhaust passage 2b is blocked, and the exhaust gas pass through the bypass exhaust passage 7 to be sequentially cleaned by the bypass catalytic converters 8. When the selector valves 4 are opened, there is communication between the upstream main exhaust passages 2a and the intermediate main exhaust passage 2b and the exhaust gas flows into the intermediate main exhaust passage 2b to be cleaned by the main catalytic converter 3.

The smaller the distance and passage volume of the main exhaust passage 2 upstream of the selector valves 4 are, the more readily the temperature of the exhaust gas in the bypass exhaust passage 7 will rise immediately after the engine is cold started. The upstream bypass exhaust passages 7a of the bypass exhaust passage 7 that branch from each of the upstream main exhaust passages 2a have cross sectional areas that are considerably smaller than that of the upstream main exhaust passages 2a. Consequently, while some of the exhaust gas flows to the bypass exhaust passage 7 when the main exhaust passage 2 is blocked, most of the exhaust gas flows to the main exhaust passage 2 when the main exhaust passage 2 is opened. The branch points 9 where the upstream ends of the upstream bypass exhaust passages 7a connect to the upstream main exhaust passages 2a are positioned as far upstream as possible with respect to the upstream main exhaust passages 2a. The upstream bypass exhaust passages 7a merge together and connect to the single downstream bypass exhaust passage 7b. As explained previously, the downstream side of the downstream bypass exhaust passage 7b merges with the connection (merge) point P where the intermediate main exhaust passage 2b and the downstream main exhaust passage 2c are connected together. Although the upstream bypass exhaust passages 7a are depicted as being comparatively long in the simple schematic view of FIG. 1, the upstream bypass exhaust passages 7a are actually configured to be as short as possible. In other words, the upstream bypass exhaust passages 7a are configured to merge with the downstream bypass exhaust passage 7b through the shortest distance possible.

Each of the bypass catalytic converter 8 includes a three-way catalyst that is arranged in an intermediate portion of the downstream bypass exhaust passage 7b. The bypass catalytic converters 8 are arranged as far upstream in the downstream bypass exhaust passage 7b as possible. The downstream bypass exhaust passage 7b is also configured to be as short as possible. The bypass catalytic converters 8 have smaller capacities than the main catalytic converter, and preferably use a catalyst that has excellent low temperature activity. The bypass catalytic converters 8 are arranged as far upstream as possible, i.e., as close as possible to the engine, so that it can be activated early after the engine is started.

Cleaned exhaust gas exiting the bypass catalytic converters 8 flow through the downstream bypass exhaust passage 7b and into the downstream main exhaust passage 2c at the connection or merge point P where the intermediate main exhaust passage 2b and the downstream main exhaust passage 2c connected together.

A first air fuel ratio sensor 19a is arranged on the upstream sides of the bypass catalytic converters 8 and a second air fuel ratio sensor 19b is arranged on the upstream side of the main catalytic converter 3. The air fuel ratio sensors 19a and 19b are configured and arranged to detect the air fuel ratio of the exhaust gas entering the respective ones of the catalytic converters 8 and 3. A first oxygen sensor 20a is arranged on the downstream sides of the bypass catalytic converters 8 and a second oxygen sensor 20b is arranged on the downstream side of the main catalytic converter 3. The oxygen sensors 20a and 20b are configured and arranged to detect the excess air state of the exhaust gas exiting the respective catalytic converters 8 and 3.

The outputs of the sensors 19a, 19b, 20a and 20b are fed to a controller 30 contrived to execute comprehensive control of the exhaust gas cleaning apparatus. In addition to the output of the sensors 19a, 19b, 20a, and 20b, the controller 30 also receives signals from a rotational speed sensor 50, an accelerator pedal sensor 51, and a throttle sensor 52 indicating the rotational speed of the engine, the accelerator pedal position, and the throttle valve opening degree, respectively. Based on the information from these sensors, the controller 30 determines the activation state of the catalytic converters 3 and 8 and controls the open-close state of the selector valves 4 and the fuel injection of the engine accordingly.

The controller 30 is an integrated controller that functions as an engine control unit (ECU) to control the opening and closing of the selector valves 4 and the operational state of the internal combustion engine. The controller 30 preferably includes a microcomputer with an engine control program that controls the operational state of the internal combustion engine as discussed below. The controller 30 also includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 30 can be any combination of hardware and software that will carry out the functions of the present invention.

The catalyst of the main catalytic converter 3 contains a cerium oxide additive that serves to perform a storage function of absorbing or releasing oxygen in the exhaust gas. Based on the output of the second air fuel ratio sensor 19b, the controller 30 controls, for example, a fuel injection condition such that the oxygen stored in the main catalytic converter 3 is released or absorbed and the amount of oxygen stored in the main catalytic converter 3 is placed within a prescribed range.

As explained below, with the illustrated embodiment, when the flow of exhaust gas is switched from the bypass exhaust passage 7 to the main exhaust passage 2 by the controller 30, the internal combustion engine is controlled by the controller 30 to a combustion state in which combustion takes place with a rich air fuel ratio. This control to a rich combustion state is executed in coordination with the open operation of the selector valves 4. The rich exhaust gas discharged from the engine flows through the bypass exhaust passage 7 and mixes with air remaining in the main exhaust passage 2 downstream of the selector valves 4 before flowing into the main catalytic converter 3. Thus, when the selector valves 4 are opened, the air fuel ratio of the exhaust gas mixture that enters the main catalytic converter 3 is stoichiometric and a situation in which a stoichiometric exhaust gas mixes with air and becomes a lean mixture before entering the main catalytic converter 3 can be prevented. As a result, the exhaust gas is sufficiently cleaned and NOx is prevented from being discharged to the outside.

The exhaust gas cleaning control executed in the controller 30 of the exhaust gas cleaning apparatus 100, as described above, will now be explained. In particular, the exhaust gas cleaning control executed in the controller 30 when the selector valves 4 are operated from a closed state to an open state such that the flow of exhaust gas is switched from the bypass exhaust passage 7 to the main exhaust passage 2 will now be explained.

Immediately after the internal combustion engine is started, the exhaust gas is directed to the bypass catalytic converters 8, which have small capacities and reach their activation temperature quickly. In addition to cleaning the exhaust gas, passing the exhaust gas downstream to the main catalytic converter 3 accelerates the heating of the main catalytic converter 3.

When the main catalytic converter 3 reaches its activation temperature, the selector valves 4 are operated (opened) to the open state, and the exhaust gas is redirected such that the exhaust gas flows directly into the main exhaust passage without passing through the bypass exhaust passage 7. Thus, the exhaust gas flows directly to the main catalytic converter 3 through the upstream main exhaust passages 2a, the intermediate main exhaust passage 2b, and the downstream main exhaust passage 2c.

Before the selector valves 4 are opened, the air fuel ratio of the exhaust gas is controlled to an air fuel ratio that is well suited for cleaning the exhaust gas with the bypass catalytic converters 8. In the case of a cold start, immediately after the engine is started, the selector valves 4 are closed before an exhaust gas can pass through the selector valves 4. Consequently, residual air (outside air) remains inside the intermediate main exhaust passage 2b downstream of the selector valves 4. If stoichiometric combustion occurs while the selector valves 4 are closed, once the selector valves 4 are opened, the residual air inside the intermediate main exhaust passage 2b flows and mixes with stoichiometric exhaust gas from the bypass exhaust passage 7, thereby forming a lean exhaust gas mixture that enters the main catalytic converter 3. In this case, since the main catalytic converter 3 is contrived to clean exhaust gas that has a stoichiometric air fuel ratio, main catalytic converter 3 cannot sufficiently clean the lean exhaust gas even if it is in an active state.

An exhaust gas cleaning control in accordance with the illustrated embodiment will now be explained which is contrived to resolve this problem of a lean exhaust gas mixture entering the main catalytic converter 3.

Figure 2:
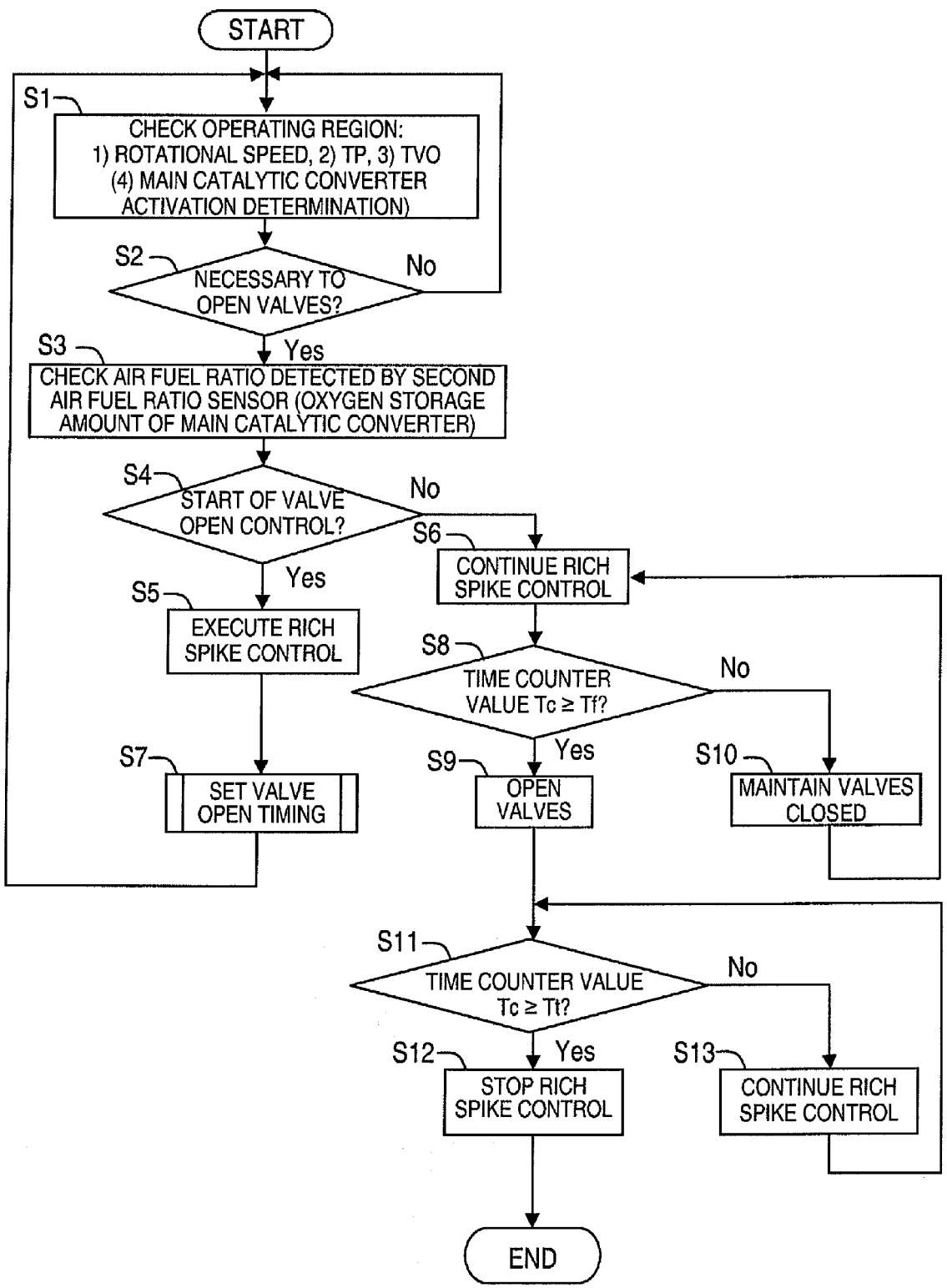
FIG. 2 is a flowchart showing the processing steps executed during the exhaust gas cleaning control by the controller of the exhaust gas cleaning apparatus illustrated in FIG. 1.

FIG. 2 is a flowchart showing the processing steps of an exhaust gas cleaning control in accordance with the present invention. This control is executed by the controller 30, for example, each time the engine is started.

In step S1, the controller 30 checks the engine operating region or condition of the engine. More specifically, the controller 30 reads the rotational speed of the engine, the accelerator pedal position (TP), the throttle valve opening degree (TVO), and the outputs of the second air fuel ratio sensor 19b and the second oxygen sensor 20b. Based on these detected values, the controller 30 determines the operating state of the engine and the activation state of the main catalytic converter 3.

In step S2, the controller 30 determines if the determined operating state is a state which requires the selector valves 4 to be opened. Conditions requiring the selector valves 4 to be opened include the main catalytic converter 3 being in an active state and a large load being demanded of the engine while the exhaust gas is being directed to the bypass exhaust passage. When either condition exists, the controller 30 executes control to open the selector valves 4. If the controller 30 determines in step S2 that the selector valves 4 need to be opened, then the controller 30 proceeds to step S3. Otherwise, the controller 30 returns to step S1.

In step S3, the controller 30 reads the output of the second air fuel ratio sensor 19b and checks that the oxygen absorption amount of the main catalytic converter 3 is within a prescribed range. In step S4, the controller 30 determines if current control cycle is the first control cycle in which the control for opening the selector valves 4 will be executed. If the open control is being executed for the first time (i.e., start of valve open control), then the controller 30 proceeds to step S5. Before starting the control for opening the selector valves 4, the air fuel ratio of the exhaust gas is controlled to an air fuel ratio that is well suited for cleaning the exhaust gas with the bypass catalytic converters 8.

In step S5, the controller 30 temporarily increases the amount of fuel injected into the combustion chamber of the engine (rich spike control) such that rich exhaust gas is sent to the bypass exhaust passage 7. During the rich spike control, the fuel is controlled such that an air fuel mixture having a stoichiometric air fuel ratio is obtained when the rich exhaust gas mixes with the residual air remaining inside the intermediate main exhaust passage 2b.

Figure 3:
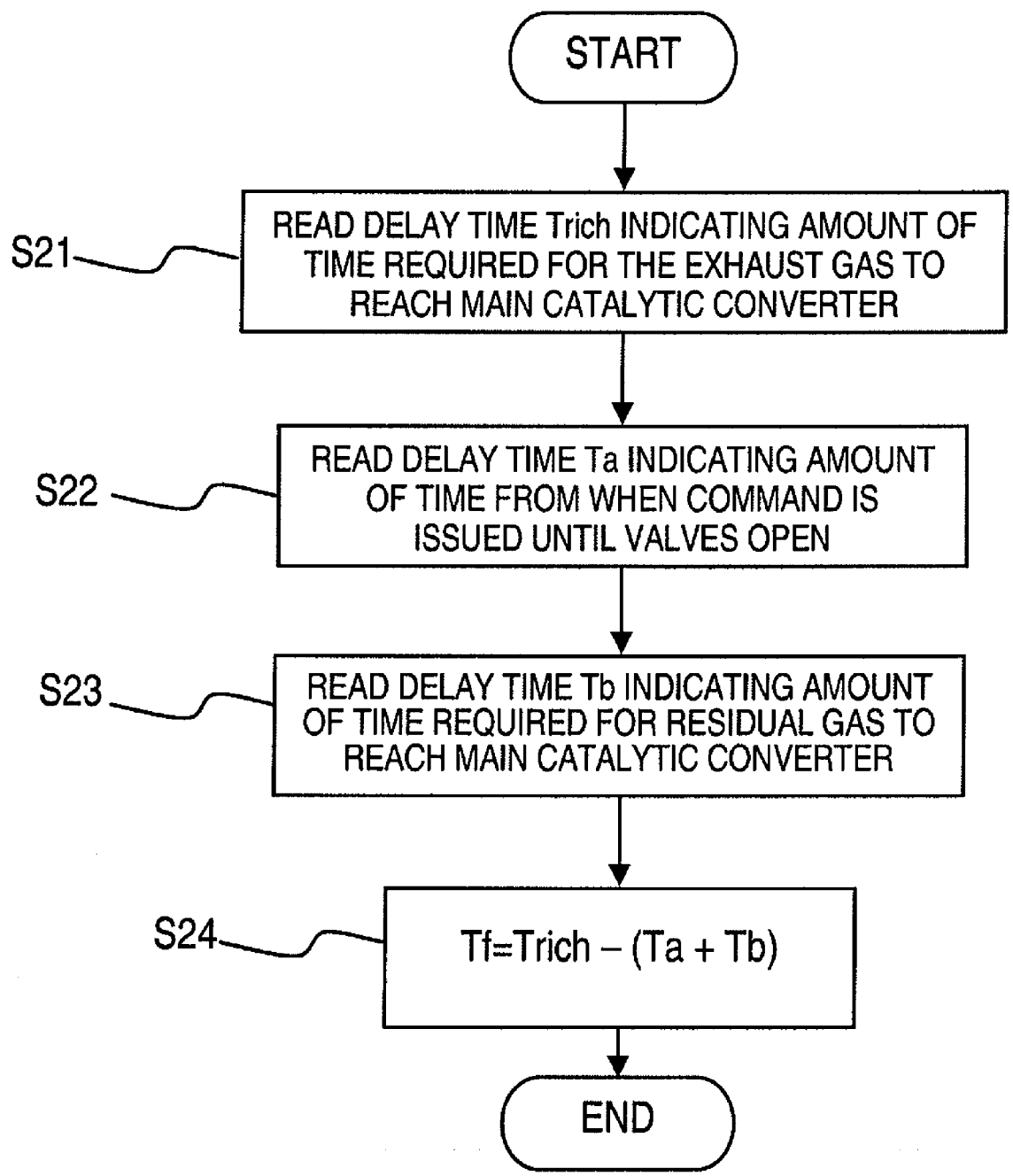
FIG. 3 is a flowchart showing the processing steps executed by the controller of the exhaust gas cleaning apparatus illustrated in FIG. 1 for setting the delay time Tf.

In step S7, the controller 30 sets a delay time Tf indicating the amount of time that will be waited from when the rich spike control of step S5 is started until a signal instructing the selector valves 4 to open is actually issued. After the delay time Tf is set, the controller 30 returns to step S1. The method of setting the delay time Tf will now be explained using the flowchart shown in FIG. 3.

In step S21, the controller 30 reads a time Trich indicating the amount of time required for the exhaust gas discharged from the engine during rich spike control to reach the main catalytic converter 3. The time Trich is a predetermined amount of time that is determined in advance either experimentally or by some other means. In steps S2, the controller 30 reads a delay time Ta indicating the amount of time required for the selector valves 4 to actually open after the open command is sent to the selector valves 4. In step S23, the controller 30 reads a delay time Tb indicating the time required for the residual air inside the intermediate main exhaust passage 2b to reach the main catalytic converter 3 after the selector valves 4 are actually opened. The delay times Ta and Tb are predetermined amounts of times that are determined in advance either experimentally or by some other means. Then, in step S24, the controller 30 calculates the delay time Tf using the equation shown below.

$$Tf=Trich-(Ta+Tb) \tag{1}$$

Returning to the flowchart of FIG. 2, in step S6, since the valve open control of the selector valves 4 has been executed more than once, the delay time Tf has already been set and the controller 30 continues the rich spike control. In step S8, the controller 30 determines if the value Tc of a time counter is equal to or larger than the delay time Tf set in step S7. The time counter value Tc indicates the amount of time elapsed since the rich spike control was started (in step S5). The value Tf is a prescribed amount of time from when risk spike control is started until the selector valve open command is issued. In other words, when the condition is satisfied and the prescribed amount of time Tf has elapsed (i.e., $Tc \geq Tf$), the controller 30 then proceeds to step S9 and issues the open command to the selector valves 4. The air inside the intermediate main exhaust passage 2b then mixes with the rich exhaust gas from the bypass exhaust passage 7 and forms a mixture having a stoichiometric air fuel ratio before entering the main catalytic converter 3. Meanwhile, if the condition (i.e., $Tc \geq Tf$) is not satisfied, then the controller 30 proceeds to step S10 and returns to step S6 without opening the selector valves 4 (i.e., leaves the selector valves 4 closed).

After step S9, the controller 30 proceeds to step S11 and determines if the time Tc, which has elapsed since the selector valves 4 were opened, is equal to or larger than a prescribed amount of time Tt. The prescribed amount of time Tt indicates the amount of time required for all of the residual air inside the intermediate main exhaust passage 2b to flow into the main catalytic converter 3.

The amount of time during which rich spike control is continued is set based on the residual air. The amount of time the rich spike control is continued can be shortened by positioning the connection or merge point P where the bypass exhaust passage 7 merges with the main exhaust passage 2 as far upstream as possible such that the intermediate main exhaust passage 2b is shorter and the amount of residual air is smaller.

Figure 4:
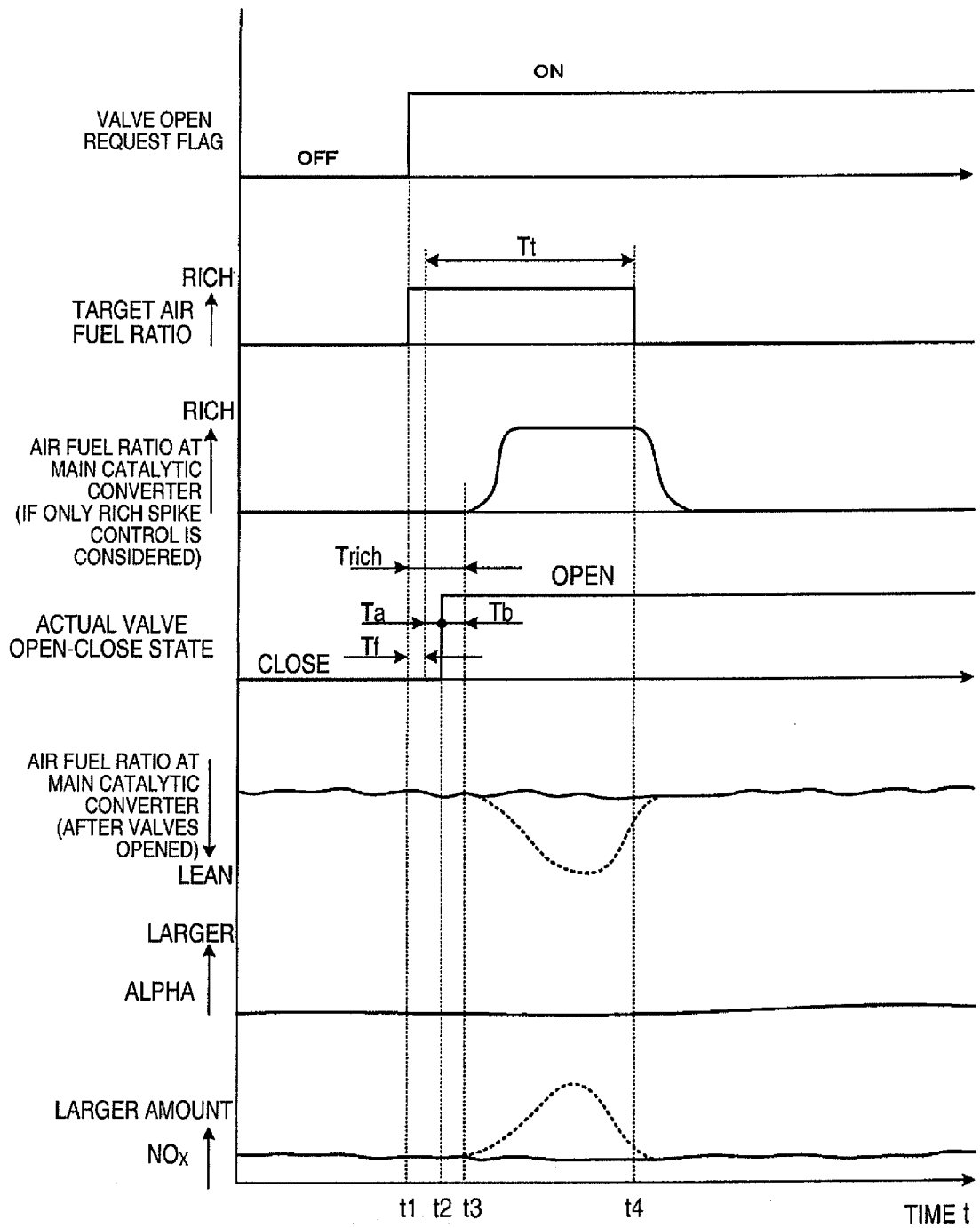
FIG. 4 is a time chart for explaining the exhaust gas cleaning control of the controller of the exhaust gas cleaning apparatus illustrated in FIG. 1.

FIG. 4 illustrates the control presented in the flowchart of FIG. 2 in the form of a time chart. At, for example, a time t1, the main catalytic converter 3 reaches the activation temperature and the condition for opening the selector valves 4 is satisfied for the first time. An open flag is turned on (step S2). Simultaneously with the flag turning on, a target air fuel ratio is changed to a richer value and rich spike control is executed. If the selector valves 4 remained closed, the rich spike control would cause the air fuel ratio of the exhaust gas entering the main catalytic converter 3 to become richer, as shown in the figure.

The selector valves 4 actually open at a time t2 occurring when a delay time Tf+Ta has elapsed since the time t1, and at a time t3 occurring when a delay time Tb has elapsed since the time t2, the residual air inside the intermediate main exhaust passage 2b mixes with the rich exhaust gas discharged from the combustion chamber of the engine and enters the main catalytic converter 3. If the rich spike control were not executed, then stoichiometric exhaust gas from the bypass exhaust passage 7 would mix with the air from the intermediate main exhaust passage 2b and a lean mixture would enter the main catalytic converter 3, resulting in incomplete cleaning of the exhaust gas and incomplete removal of the NOx (indicated with broken line in figure). However, with the illustrated embodiment, the combustion state of the engine is controlled such that rich exhaust gas passes through the bypass exhaust passage 7 and arrives at the main catalytic converter 3 in coordination with the timing at which the selector valves 4 are opened and the residual air from the intermediate main exhaust passage 2b arrives at the main catalytic converter 3. Consequently, the air and the rich exhaust gas mix together and enter the main catalytic converter 3 as a stoichiometric mixture. As a result, even immediately after the selector valves 4 are opened, the exhaust gas entering the main catalytic converter 3 has a stoichiometric air fuel ratio and can be cleaned sufficiently by the main catalytic converter 3.

At a time t4, when it is estimated that all of the residual air in the intermediate main exhaust passage 2b has entered the main catalytic converter 3, the rich spike control is ended and the controller 30 switches to a normal exhaust gas cleaning control.

In this way, when the main catalytic converter 3 reaches an activation temperature and the flow of exhaust gas from the engine is redirected from the bypass exhaust passage 7 to the main exhaust passage 2, the combustion state of the engine is controlled to a rich state in coordination with the timing at which the selector valves 4 are operated such that rich exhaust gas flows through the bypass exhaust passage 7. The rich exhaust gas flowing through the bypass exhaust passage 7 mixes with the residual air that flows from the intermediate main exhaust passage 2b when the selector valves 4 are opened. The resulting stoichiometric mixture enters the main catalytic converter 3, and is cleaned. Thus, even when the flow path of the exhaust gas is changed after the engine is started, the exhaust gas can be cleaned in a reliable fashion by the main catalytic converter 3.

In this embodiment, the amount of time Ta from when the open command is sent to the selector valves 4 until the valves 4 actually open is taken into account when setting the amount of time to elapse before sending the open command to the selector valves 4. However, the time Ta can be assumed to be 0 if the amount of time required for the valves 4 to open after the command is sent is small enough to be ignored. In such a case, the amount of time Tf that elapses between when the rich spike control is started and when the open command is sent to the selector valves 4 can be assumed to be substantially equal to the amount of time that elapses between when the rich spike control is started and when the selector valves 4 actually open. Therefore, the amount of time Tf can be set based on the amount of time Trich required for the exhaust gas discharged from the engine due to rich spike control to reach the main catalytic converter 3 and the delay time Tb required for the residual air in the intermediate main exhaust passage 2b to reach the main catalytic converter 3 (Tf=Trich−Tb).

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An exhaust gas cleaning apparatus comprising:
    a main exhaust passage configured to receive exhaust gas from an internal combustion engine therethrough;
    a main catalytic converter disposed in the main exhaust passage;
    a bypass exhaust passage including a first end connected to the main exhaust passage at a first point that is upstream from the main catalytic converter and a second end connected to the main exhaust passage at a second point that is upstream from the main catalytic converter;
    a bypass catalytic converter disposed in the bypass exhaust passage between the first and second ends of the bypass exhaust passage;
    a selector valve arranged to selectively control a flow of the exhaust gas from the internal combustion engine between the main exhaust passage and the bypass exhaust passage; and a controller configured to control a combustion state of the internal combustion engine and to selectively open and close of the selector valve, the controller being further configured to control the internal combustion engine to a rich combustion state with a rich air fuel ratio while the controller controls the selector valve to block the flow of the exhaust gas through the main exhaust passage, and then, afterwards, controls the selector valve to direct the flow of the exhaust gas through the main exhaust passage such that residual air remaining in the main exhaust passage mixes with rich exhaust gas from the bypass exhaust passage, with the controller commencing to control the internal combustion engine to the rich combustion state in response to the main catalytic converter reaching an active state.

2. The exhaust gas cleaning apparatus as recited in claim 1, wherein
the bypass exhaust passage is arranged to branch from the main exhaust passage at the first point and merge with the main exhaust passage at the second point,
the first and second ends of the bypass exhaust passage being communicated to each other through the bypass exhaust passage when the selector valve directs the flow of the exhaust gas through the main exhaust passage.

3. The exhaust gas cleaning apparatus as recited in claim 2, wherein
the selector valve is provided in the main exhaust passage, and
the controller is further configured to close the selector valve for directing the exhaust gas into the bypass exhaust passage prior to the main catalytic converter reaching an active state and to open the selector valve for directing the exhaust gas into the main exhaust passage when the main catalytic converter has reached the active state.

4. The exhaust gas cleaning apparatus as recited in claim 2, wherein
the controller is further configured to control the internal combustion engine to a combustion state with an air fuel ratio that is less rich than the rich air fuel ratio while the controller controls the selector valve to block the flow of the exhaust gas through the main exhaust passage.

5. The exhaust gas cleaning apparatus as recited in claim 2, wherein
the main exhaust passage includes a plurality of upstream main exhaust passages and the bypass exhaust passage includes a plurality of upstream bypass exhaust passages with one of the upstream bypass exhaust passages being connected to a corresponding one of upstream main exhaust passages.

6. The exhaust gas cleaning apparatus as recited in claim 5, wherein
one of the upstream main exhaust passages has the selector valve disposed therein and each of remaining ones of the upstream main exhaust passages has a separate selector valve disposed therein.

7. The exhaust gas cleaning apparatus as recited in claim 5, wherein
the upstream main exhaust passages have downstream ends that merge together at a merger point with the selector valve being disposed at or downstream of the merger point.

8. An exhaust gas cleaning apparatus comprising:
a main exhaust passage configured to receive exhaust gas from an internal combustion engine therethrough;
a main catalytic converter disposed in the main exhaust passage;
a bypass exhaust passage including a first end connected to the main exhaust passage at a first point that is upstream from the main catalytic converter and a second end connected to the main exhaust passage at a second point that is upstream from the main catalytic converter;
a bypass catalytic converter disposed in the bypass exhaust passage between the first and second ends of the bypass exhaust passage;
a selector valve arranged to selectively control a flow of the exhaust gas from the internal combustion engine between the main exhaust passage and the bypass exhaust passage, with the selector valve being provided in the main exhaust passage; and
a controller configured to control a combustion state of the internal combustion engine and to selectively open and close of the selector valve, the controller being further configured to control the internal combustion engine to a rich combustion state with a rich air fuel ratio while the controller controls the selector valve to block the flow of the exhaust gas through the main exhaust passage, and then, afterwards, controls the selector valve to direct the flow of the exhaust gas through the main exhaust passage such that residual air remaining in the main exhaust passage mixes with rich exhaust gas from the bypass exhaust passage,
the controller being further configured to close the selector valve for directing the exhaust gas into the bypass exhaust passage prior to the main catalytic converter reaching an active state and to open the selector valve for directing the exhaust gas into the main exhaust passage when the main catalytic converter has reached the active state,
the controller being further configured to open the selector valve for switching the flow of the exhaust gas from the bypass exhaust passage to the main exhaust passage when a prescribed amount of time has elapsed since operation of the internal combustion engine in the rich combustion state was started, and
the prescribed amount of time being set based on an amount of time required for the exhaust gas discharged from the internal combustion engine while the internal combustion engine is operated in the rich combustion state to pass through the bypass exhaust passage and arrive at the main catalytic converter and an amount of time required for the residual air remaining in the main exhaust passage before the selector valve is opened to flow and arrive at the main catalytic converter after the selector valve is opened.

9. The exhaust gas cleaning apparatus as recited in claim 8, wherein
the controller is further configured to set a timing for sending an open command to the selector valve based on an amount of time required for the selector valve to actually open after the open command is sent from the controller to the selector valve.

10. An exhaust gas cleaning apparatus comprising:
a main exhaust passage configured to receive exhaust gas from an internal combustion engine therethrough;
a main catalytic converter disposed in the main exhaust passage;
a bypass exhaust passage including a first end connected to the main exhaust passage at a first point that is upstream from the main catalytic converter and a second end connected to the main exhaust passage at a second point that is upstream from the main catalytic converter;

a bypass catalytic converter disposed in the bypass exhaust passage between the first and second ends of the bypass exhaust passage;

a selector valve arranged to selectively control a flow of the exhaust gas from the internal combustion engine between the main exhaust passage and the bypass exhaust passage; and a controller configured to control a combustion state of the internal combustion engine and to selectively open and close of the selector valve, the controller being further configured to control the internal combustion engine to a rich combustion state with a rich air fuel ratio while the controller controls the selector valve to block the flow of the exhaust gas through the main exhaust passage, and then, afterwards, controls the selector valve to direct the flow of the exhaust gas through the main exhaust passage such that residual air remaining in the main exhaust passage mixes with rich exhaust gas from the bypass exhaust passage, the controller being further configured to open the selector valve such that the rich exhaust gas from the bypass exhaust passage arrives at the main catalytic converter at the same time as the residual air remaining in the main exhaust passage arrives at the main catalytic converter.

11. An exhaust gas cleaning apparatus comprising:

a main exhaust passage configured to receive exhaust gas from an internal combustion engine therethrough;

a main catalytic converter disposed in the main exhaust passage;

a bypass exhaust passage including a first end connected to the main exhaust passage at a first point that is upstream from the main catalytic converter and a second end connected to the main exhaust passage at a second point that is upstream from the main catalytic converter;

a bypass catalytic converter disposed in the bypass exhaust passage between the first and second ends of the bypass exhaust passage;

a selector valve arranged to selectively control a flow of the exhaust gas from the internal combustion engine between the main exhaust passage and the bypass exhaust passage, with the selector valve being provided in the main exhaust passage; and a controller configured to control a combustion state of the internal combustion engine and to selectively open and close of the selector valve, the controller being further configured to control the internal combustion engine to a rich combustion state with a rich air fuel ratio while the controller controls the selector valve to block the flow of the exhaust gas through the main exhaust passage, and then, afterwards, controls the selector valve to direct the flow of the exhaust gas through the main exhaust passage such that residual air remaining in the main exhaust passage mixes with rich exhaust gas from the bypass exhaust passage, the controller being further configured to close the selector valve for directing the exhaust gas into the bypass exhaust passage prior to the main catalytic converter reaching an active state and to open the selector valve for directing the exhaust gas into the main exhaust passage when the main catalytic converter has reached the active state, the controller being further configured to set an amount of time in which the combustion state is controlled to the rich air fuel ratio before opening the selector valve based on an amount of the residual air remaining inside the main exhaust passage before the selector valve is opened.

12. An exhaust gas cleaning control method for an exhaust system including a main exhaust passage with a main catalytic converter disposed in the main exhaust passage, a bypass exhaust passage with a bypass catalytic converter disposed in the bypass exhaust passage, and a selector valve disposed between a branching point of the bypass exhaust passage and a merging point of the bypass exhaust passage on an upstream side of the main catalytic converter to selectively open and close the main exhaust passage to switch a pathway for the exhaust gas between the main exhaust passage and the bypass exhaust passage, the method comprising:

detecting an operating condition of at least one of the internal combustion engine and the main catalytic converter;

conducting exhaust gas from an internal combustion engine through one of the main exhaust passage and the bypass exhaust passage to the main catalytic;

selectively controlling the selector valve to block or open the flow of the exhaust gas through the main exhaust passage to the main catalytic converter based on the operating condition that was detected; and controlling a combustion state of the internal combustion engine to a rich combustion state with a rich air fuel ratio while the controlling the selector valve to block the flow of the exhaust gas through the main exhaust passage, and then, afterwards, controlling the selector valve to direct the flow of the exhaust gas through the main exhaust passage such that residual air remaining in the main exhaust passage mixes with rich exhaust gas from the bypass exhaust passage, the selectively controlling of the selector valve including closing the selector valve for directing the exhaust gas into the bypass exhaust passage prior to the main catalytic converter reaching an active state, and opening the selector valve for directing the exhaust gas into the main exhaust passage when the main catalytic converter has reached the active state, the selectively controlling of the selector valve further including opening the selector valve for switching the flow of the exhaust gas from the bypass exhaust passage to the main exhaust passage when a prescribed amount of time has elapsed since operation of the internal combustion engine in the rich combustion state was started, with the prescribed amount of time being set based on an amount of time required for the exhaust gas discharged from the internal combustion engine while the internal combustion engine is operated in the rich combustion state to pass through the bypass exhaust passage and arrive at the main catalytic converter and an amount of time required for the residual air remaining in the main exhaust passage before the selector valve is opened to flow and arrive at the main catalytic converter after the selector valve is opened.

13. The exhaust gas cleaning control method as recited in claim 12, further comprising setting a timing for sending an open command to the selector valve based on an amount of time required for the selector valve to actually open after the open command is sent from the controller to the selector valve.

14. An exhaust gas cleaning control method for an exhaust system including a main exhaust passage with a main catalytic converter disposed in the main exhaust passage, a bypass exhaust passage with a bypass catalytic converter disposed in the bypass exhaust passage, and a selector valve disposed between a branching point of the bypass exhaust passage and a merging point of the bypass exhaust passage on an upstream side of the main catalytic converter to selectively open and close the main exhaust passage to switch a pathway for the exhaust gas between the main exhaust passage and the bypass exhaust passage, the method comprising:

detecting an operating condition of at least one of the internal combustion engine and the main catalytic converter;

conducting exhaust gas from an internal combustion engine through one of the main exhaust passage and the bypass exhaust passage to the main catalytic;

selectively controlling the selector valve to block or open the flow of the exhaust gas through the main exhaust passage to the main catalytic converter based on the operating condition that was detected; and controlling a combustion state of the internal combustion engine to a rich combustion state with a rich air fuel ratio while the controlling the selector valve to block the flow of the exhaust gas through the main exhaust passage, and then, afterwards, controlling the selector valve to direct the flow of the exhaust gas through the main exhaust passage such that residual air remaining in the main exhaust passage mixes with rich exhaust gas from the bypass exhaust passage, the selectively controlling of the selector valve including opening the selector valve such that the rich exhaust gas from the bypass exhaust passage arrives at the main catalytic converter at the same time as the residual air remaining in the main exhaust passage arrives at the main catalytic converter.

15. An exhaust gas cleaning control method for an exhaust system including a main exhaust passage with a main catalytic converter disposed in the main exhaust passage, a bypass exhaust passage with a bypass catalytic converter disposed in the bypass exhaust passage, and a selector valve disposed between a branching point of the bypass exhaust passage and a merging point of the bypass exhaust passage on an upstream side of the main catalytic converter to selectively open and close the main exhaust passage to switch a pathway for the exhaust gas between the main exhaust passage and the bypass exhaust passage, the method comprising:

detecting an operating condition of at least one of the internal combustion engine and the main catalytic converter;

conducting exhaust gas from an internal combustion engine through one of the main exhaust passage and the bypass exhaust passage to the main catalytic;

selectively controlling the selector valve to block or open the flow of the exhaust gas through the main exhaust passage to the main catalytic converter based on the operating condition that was detected, the selectively controlling of the selector valve including closing the selector valve for directing the exhaust gas into the bypass exhaust passage prior to the main catalytic converter reaching an active state, and opening the selector valve for directing the exhaust gas into the main exhaust passage when the main catalytic converter has reached the active state;

controlling a combustion state of the internal combustion engine to a rich combustion state with a rich air fuel ratio while the controlling the selector valve to block the flow of the exhaust gas through the main exhaust passage, and then, afterwards, controlling the selector valve to direct the flow of the exhaust gas through the main exhaust passage such that residual air remaining in the main exhaust passage mixes with rich exhaust gas from the bypass exhaust passage; and setting an amount of time in which the combustion state is controlled to the rich air fuel ratio before opening the selector valve based on an amount of the residual air remaining inside the main exhaust passage before opening the selector valve.

16. An exhaust gas cleaning control method for an exhaust system including a main exhaust passage with a main catalytic converter disposed in the main exhaust passage, a bypass exhaust passage with a bypass catalytic converter disposed in the bypass exhaust passage, and a selector valve disposed between a branching point of the bypass exhaust passage and a merging point of the bypass exhaust passage on an upstream side of the main catalytic converter to selectively open and close the main exhaust passage to switch a pathway for the exhaust gas between the main exhaust passage and the bypass exhaust passage, the method comprising:

detecting an operating condition of at least one of the internal combustion engine and the main catalytic converter;

conducting exhaust gas from an internal combustion engine through one of the main exhaust passage and the bypass exhaust passage to the main catalytic;

selectively controlling the selector valve to block or open the flow of the exhaust gas through the main exhaust passage to the main catalytic converter based on the operating condition that was detected; and controlling a combustion state of the internal combustion engine to a rich combustion state with a rich air fuel ratio while the controlling the selector valve to block the flow of the exhaust gas through the main exhaust passage, and then, afterwards, controlling the selector valve to direct the flow of the exhaust gas through the main exhaust passage such that residual air remaining in the main exhaust passage mixes with rich exhaust gas from the bypass exhaust passage, with the controlling of the combustion state of the internal combustion engine to the rich combustion state being commenced in response to the main catalytic converter reaching an active state.

17. The exhaust gas cleaning control method as recited in claim 16, wherein the bypass exhaust passage of the exhaust system is arranged to branch from the main exhaust passage of the exhaust system at the branching point and merge with the main exhaust passage of the exhaust system at the merging point, with the branching point and the merging point of the bypass exhaust passage being communicated to each other through the bypass exhaust passage upon controlling of the selector valve to direct the flow of the exhaust gas through the main exhaust passage.

18. The exhaust gas cleaning control method as recited in claim 17, wherein the selectively controlling of the selector valve includes closing the selector valve for directing the exhaust gas into the bypass exhaust passage prior to the main catalytic converter reaching an active state, and opening the selector valve for directing the exhaust gas into the main exhaust passage when the main catalytic converter has reached the active state.

\* \* \* \* \*